Dec. 19, 1961 D. BIERMANN Re. 25,096

CONSTANT SPEED AND FEATHERING PROPELLER

Original Filed March 18, 1957 2 Sheets-Sheet 1

INVENTOR.
DAVID BIERMANN

BY Toulmin & Toulmin
ATTORNEYS

CONSTANT SPEED AND FEATHERING PROPELLER

Original Filed March 18, 1957 2 Sheets-Sheet 2

INVENTOR.
DAVID BIERMANN
BY Toulmin & Toulmin
ATTORNEYS

United States Patent Office

Re. 25,096
Reissued Dec. 19, 1961

25,096
CONSTANT SPEED AND FEATHERING PROPELLER

David Biermann, Piqua, Ohio, assignor to Hartzell Propeller, Inc., Piqua, Ohio, a corporation of Ohio Original No. 2,948,344, dated Aug. 9, 1960, Ser. No. 646,792, Mar. 18, 1957. Application for reissue Sept. 30, 1960, Ser. No. 60,283
8 Claims. (Cl. 170—160.32)

Matter enclosed in heavy brackets [ ] appears in the original patent but forms no part of this reissue specification; matter printed in italics indicates the additions made by reissue.

This invention relates to variable pitch propellers and in particular to propellers which can be controlled merely by controlling the supply of oil pressure thereto.

Most adjustable pitch propellers employ a combination of forces in adjusting the propeller blades to the desired pitch position and ordinarily the increasing of the propeller pitch is accomplished by increasing the oil supply to the actuating device for the propeller blades. This arrangement is adequate and satisfactory whenever the oil supply to the adjusting mechanism is unimpaired but upon failure of the oil supply such an adjustable pitch propeller cannot be moved under oil pressure and thus the pitch cannot be increased to feathered position should it be necessary.

With this in mind the present invention has as a primary object the provision of a variable pitch propeller having a supply of hydraulic fluid connected therewith for changing the pitch of the propeller and in which any failure of supply of pressure fluid will cause immediate feathering of the propeller.

A still further object of this invention is the provision of a variable pitch propeller in which a supply of oil under pressure to the propeller mechanism is the only connection that need be made to the propeller when it is installed on a driving engine, all of the other mechanism being contained within the propeller structure.

A still further object of this invention is the provision of an extremely compact adjustable pitch propeller mechanism which is relatively inexpensive to construct but which has a high degree of reliability in operation.

These and other objects will become more apparent from the accompanying drawings wherein.

Figure 1:
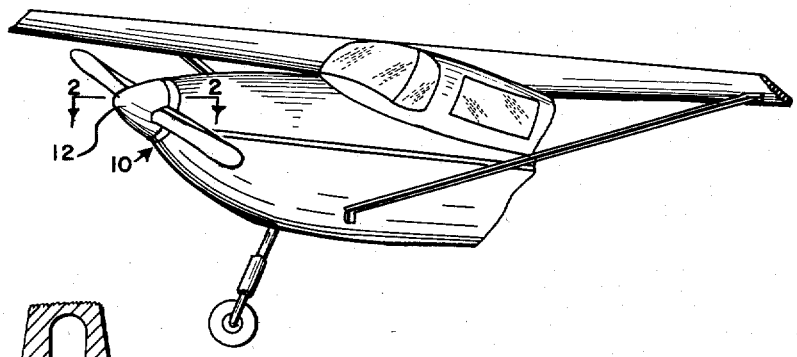
FIGURE 1 is a perspective view showing a propeller according to this invention mounted on a plane.

Referring to the drawings somewhat more in detail, FIGURES 1 through 4 show a propeller generally indicated at 10 mounted on the front end of an airplane by being attached to the drive shaft of the engine thereof and with the propeller structure preferably comprising the spinner 12 which encloses the actuating mechanism for adjusting the pitch of the propeller.

Figure 2:
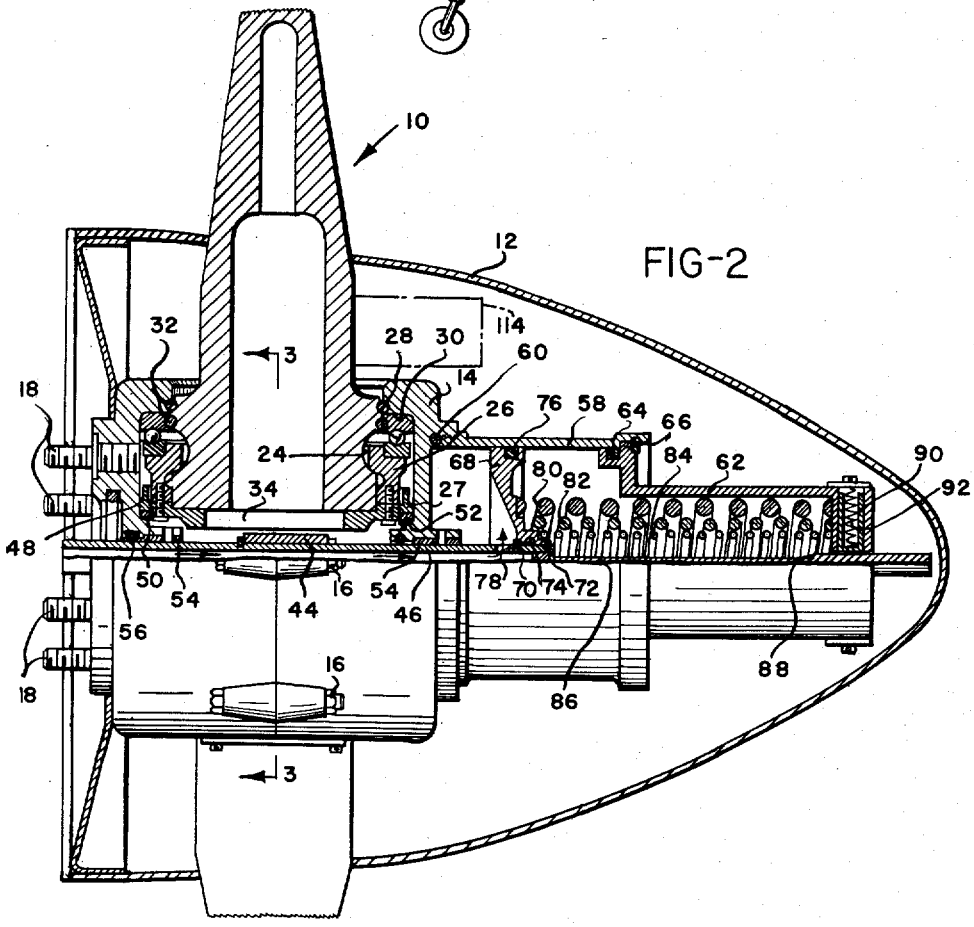
FIGURE 2 is a longitudinal section through the propeller as indicated by line 2—2 on FIGURE 1.
Figure 3:
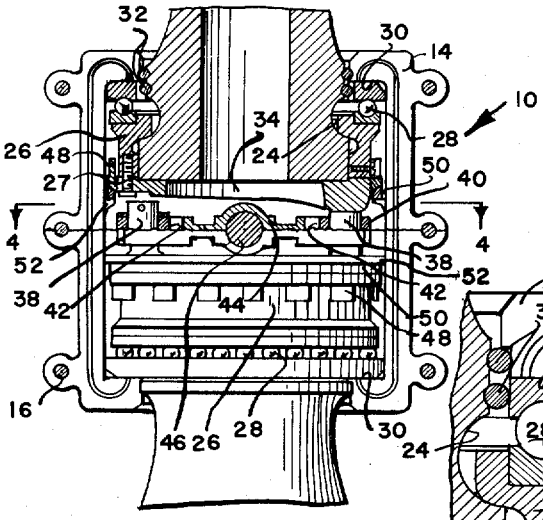
FIGURE 3 is a cross-sectional view indicated by line 3—3 on FIGURE 2.
Figure 6:
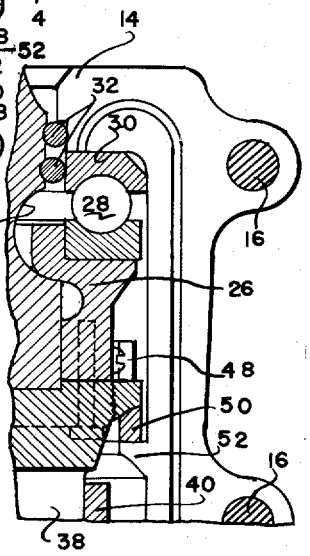
FIGURE 6 is an enlarged portion of the upper right hand area of the structure illustrated in FIGURE 3 to show the structure in greater detail and additionally to illustrate the manner in which the shift blade is connected to the blade collar by screws.
Figure 4:
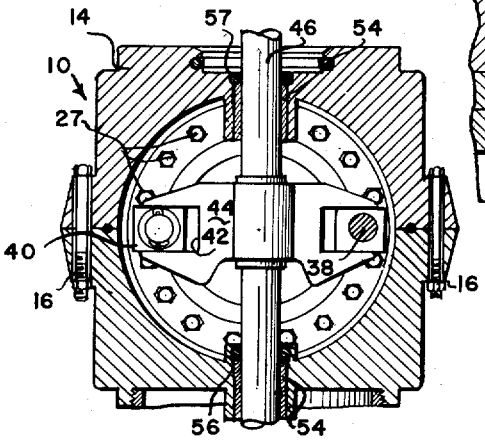
FIGURE 4 is a sectional view indicated by line 4—4 on FIGURE 3.

The construction of the propeller itself will be better seen in FIGURES 2 through 4 wherein it will be noted there is a propeller hub 14 consisting of the front and back portions interconnected by bolts 16 and with the back portion comprising studs 18 by means of which the propeller hub is connected with the driving shaft for the propeller. The blade is formed with an annular recess 24 adjacent its inner end thus providing a flange at the extreme inner end of the propeller, adapted for engagement by the split blade collar 26. Blade collar 26 engages the inner surface of the inner race of axial thrust ball bearing 28 the outer race of which fits within the circumference of the blade socket and engages the inwardly facing abutment means 30 provided about the mouth of the blade socket. By the described arrangement the blade is positively held against outward movement in the blade socket due to centrifugal forces acting on the blade through rotation of the propeller.

The sealing O rings 32 may be provided by means of which the mouth of the blade socket is sealed against foreign material.

Engaging the butt end of the blade is a shift plate or ring 34 connected with the blade collar by screws 27 and having, as will be seen in FIGURE 3, a pin 38 projecting from one side thereof extending into block 40 adapted for being received in slot 42 in a shift yoke or crosshead 44 mounted on a tube 46 extending axially through the propeller hub.

The plate or ring 34 has screw threadedly mounted on the outer periphery thereof, a preload nut 48 bearing against a ring 50 that rests on a shoulder 52 integral with the hub. Nut 48 provides means for preloading thrust bearing 28.

The aforementioned tube 46 is axially slidable within the hub by being supported therein on the bushing 54 associated with which are the sealing O rings 56 that seal off the space within the hub from the space external thereof.

Extending outwardly from the right end of the hub and coaxial with tube 46 is a cylinder 58 sealed to the hub by O ring 60 and having fitted into its outer end a spring housing 62 that also forms the outer end closure for the cylinder. The O ring 64 seals housing 62 to the cylinder wall and a snap ring 66 retains the housing in position.

On the end of tube 46 within cylinder 58 the tube has mounted thereon a piston 68 on one side of which is a split collar 70 and on the opposite side of which is snap ring 72 whereby the piston is held in position on the tube. O ring 74 seals between the piston and the tube of another O ring 76 carried by the piston seals between the piston and cylinder.

A port 78 in the tube immediately leftwardly of piston 68 provides means for admitting and discharging fluid under pressure from the left end of cylinder 58.

Located within housing 62 so as to bear between the outer end thereof and the right hand face of piston 68 are the springs 80, 82 and 84 which thrust leftwardly on the piston in opposition to the oil pressure supplied to the left end of cylinder 58. Rightward movement of the piston due to a supply of oil pressure thereto will reduce the pitch of the propeller blades whereas leftward movement of the piston under the influence of the springs will increase the pitch of the propeller blades.

Fixed to the extreme right end of tube 46 is a latch rod 86 which extends outwardly through the end of spring closure 62. Latch rod 86 has a shoulder at 88 thereon which shoulder is adaped for cooperation with a latch pin 90 carried in the spring housing and urged radially inwardly by a compression spring 92. The latch pin is adapted for moving out at the speed of 500 r.p.m. of the propeller and under normal circumstances will move inwardly and engage shoulder 88 whenever the propeller is brought to a halt in a normal manner.

This provides a high pitch stop so that the propeller is in a predetermined intermediate pitch position whenever the drive engine is to be started. Under circumstances wherein it is desired for the propeller to be feathered quickly as would occur upon engine failure or failure of the supply of oil to tube 46 during flight, and at which time the oil pressure to the left side of piston 68 is interrupted, the spring within the spring housing will thrust the propeller blades quickly to feathered position before latch member 90 has moved inwardly.

Figure 5:
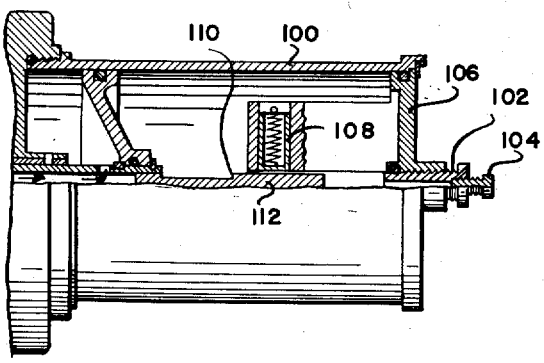
FIGURE 5 is a longitudinal view partly in section showing a modified arrangement of the actuating mechanism for the propeller blades.

The modification of FIGURE 5 is substantially identical with that of FIGURES 2 through 4 except that instead of the piston 68 being urged leftwardly by spring pressure, it is maintained under air pressure by air supplied to the inside of cylinder 100 through the hollow adjustable stop screw 102 which is closed by the air valve 104. The closure member 106 that closes the right end of cylinder 100 is formed so as to receive a high pitch stop plunger 108 which corresponds with the plunger 90 previously described. These plungers 108 cooperate with shoulder 110 formed on rod 112. Rod 112 is adapted for abutting the end of stop screw 102 to provide for low pitch stop that limits the main pitch of the propeller blades.

The supply of oil to the left end of cylinder 58, and to cylinder 100 in the FIGURE 5 modification, is preferably under the control of the governor and it is also preferable that the oil be engine oil from the driving engine for the propeller. By utilizing oil from the engine any failure in this oil supply, and which should be accompanied by immediate stopping of the engine, will cause the propeller to snap into feathered position immediately.

The propeller illustrated has a centrifugal force acting on the blades which may either be provided by the manner in which the blades themselves are constructed or there may be bolted to the propeller blades centrifugal weights as indicated in dot-dash outlined at 114 in FIGURE 2. Such weights or the off-center mass in the blade itself is so located as to develop a twisting movement on the propeller blades tending to urge them to decreased pitch position. These weights, or the off-center mass of the propeller blade, may be so positioned as to exert a turning moment tending to decrease pitch throughout the travel of the blade; but, a preferable position for the mass which generates the centrifugal force is that position wherein the mass is most effective when the propeller blade is in cruising pitch. When the mass is in this position, then when the blade is moved from cruising pitch to feathered position, an angular motion of somewhat under 90 degrees, the said mass will move from a position where it is effective in one direction into the next adjacent quadrant where it is effective in the opposite direction and at this time will tend to increase the pitch of the blade. However, at that time the propeller blades are feathered and the propeller is either halted or soon will be halted so that the mass is thus relatively ineffective during the greater part of the time that it is in the said second quadrant.

The amount of force that can be developed by the mass generating the centrifugal moment on the propeller blade will normally amount to about 3,000 pounds at the piston.

The oil pressure supplied via the governor controlled valve to the piston amounts to 200 to 400 pounds acting at the piston.

The forces tending to increase the propeller pitch consist of the spring arrangement or the compressed air of FIGURE 5 and either of which will amount to about 3,000 pounds acting on the piston. Another force tending to increase the pitch of the propeller blade is the aerodynamic twisting moment acting on the blade which amounts to 200 to 400 pounds at the piston.

It will be seen that either of the modifications of FIGURES 2 through 4 or FIGURE 5 are in balance at all times and that when change in the oil pressure will be effective for changing the pitch of the propeller.

It will be evident that the propeller of the present invention will feather independently of centrifugal forces or of oil pressure. This is particularly important where the oil pressure fails, as by breakage of an oil line or the like and it becomes essential for the engine to be halted quickly.

It has been mentioned that the counter-weight and combination with the spring could be utilized to increase propeller pitch and the oil pressure utilized to decrease the pitch. However, it is also feasible, and a practical arrangement, to place a counter-weight on a blade which has insufficient mass to overcome the twisting of the blade. In such a case, the action of the counter-weight plus the blade twisting force plus the oil pressure would tend to decrease pitch while the spring would tend to increase pitch. In this arrangement the counter-weight would act to reduce the size of the spring required as they would tend to complement each other.

It will be understood that this invention is susceptible to modification in order to adapt it to different usages and conditions; and, accordingly, it is desired to comprehend such modifications within this invention as may fall within the scope of the appended claims.

I claim:

1. A propeller having a hub, a plurality of blades mounted on said hub for limited rotation about their axes, a mass on each of said blades for generating centrifugal forces on said blades tending to urge said blades to the decreased pitch position during operation of the propeller, a cylinder mounted on said hub coaxially with the rotational axis thereof, a piston slidably mounted in said cylinder, said piston being linked to said blades to rotate said blades upon movement of said piston in said cylinder, resilient means on one side of said piston tending to urge said blades to the increased pitch position and exerting a force substantially counterbalancing said centrifugal force, and adjustable hydraulic means acting on the other side of said piston to produce a force tending to urge said blades to the decreased pitch position and substantially counterbalancing the aerodynamic forces acting on said blades when the propeller is in operation which tend to urge said blades to the increased pitch position so that a reduction in the force produced by said hydraulic means will enable said resilient means and the aerodynamic forces acting on the propeller blades to move said blades to the full pitch or feathered position.

2. A propeller as claimed in claim 1, wherein the force produced by said resilient means and said centrifugal force are each several times greater than either of said aerodynamic forces and the force produced by said hydraulic means.

3. A propeller as claimed in claim 1, wherein the force produced by said resilient means and said centrifugal force are each about 3000 pounds and the aerodynamic forces and the force produced by said hydraulic means are each about 200 to 400 pounds.

4. A propeller as claimed in claim 1, wherein said blades have a total angular movement of somewhat less than 90° between the feathered position and the low pitch position.

*5. A propeller having a hub, a plurality of blades mounted on said hub for limited rotation about their axes, a mass on each of said blades for generating centrifugal forces on said blades tending to urge said blades to the decreased pitch position during operation of the propeller, a cylinder mounted on said hub coaxially with the rotational axis thereof, a piston slidably mounted in said cylinder, said piston being linked to said blades to rotate said blades upon movement of said piston in said cylinder, resilient means on one side of said piston tending to urge said blades to the increased pitch position, adjustable hydraulic means acting on the other side of said piston to produce a force tending to urge said blades to the decreased pitch position whereby the forces including the aerodynamic force acting on said blades when the propeller is in operation are in balance and a reduction in the force produced by said hydraulic means will enable said resilient means acting on the propeller blades*

*to move said blades to the full pitch or feathered position.*

*6. A propeller as claimed in claim 5, and wherein any force produced by said resilient means and said centrifugal forces are each several times greater than the force produced by said hydraulic means.*

*7. A propeller as claimed in claim 5, and wherein the force produced by said resilient means and said centrifugal forces are each about 3000 lb. and the force produced by said hydraulic means are each about 200–400 lbs.*

*8. A propeller having a hub, a plurality of blades carried by said hub and limitedly rotatable about their longitudinal axes, said blades under the combined action of centrifugal and aerodynamic forces acting thereon tending to rotate towards the low pitch position, a cylinder mounted on said hub and disposed coaxially with respect to the rotational axis thereof, a piston slidably mounted in said cylinder, said piston being operatively connected to*

*said blades for rotation thereof, spring means acting on one side of said piston and urging the same to rotate the blades towards the feathered pitch position, and adjustable hydraulic means acting on the opposite side of said piston and against the action of said spring to provide a substantial balance of forces under varying pitch requirements, said blades having a total angular movement of somewhat less than 90 degrees between said feathered and said low pitch position.*

References Cited in the file of this patent or the original patent

UNITED STATES PATENTS

| | | |
|---|---|---|
| Re. 20,283 | Caldwell | Mar. 9, 1937 |
| 2,255,920 | Englesson | Sept. 16, 1941 |
| 2,308,228 | Matteucci | Jan. 12, 1943 |
| 2,625,998 | Berninger et al. | Jan. 20, 1953 |
| 2,722,985 | Biermann | Nov. 8, 1955 |